United States Patent [19]
Kitani et al.

[11] Patent Number: 5,463,265
[45] Date of Patent: Oct. 31, 1995

[54] VIBRATION DRIVEN MOTOR

[75] Inventors: Koji Kitani, Chofu; Tohru Nakanishi, Yokohama, both of Japan

[73] Assignee: Canon Kabushiki Kaisha, Tokyo, Japan

[21] Appl. No.: 420,630

[22] Filed: Apr. 12, 1995

Related U.S. Application Data

[63] Continuation of Ser. No. 263,491, Jun. 21, 1994, abandoned, which is a continuation of Ser. No. 879,415, May 7, 1992, abandoned.

[30] Foreign Application Priority Data

May 8, 1991 [JP] Japan ................................. 3-102831

[51] Int. Cl.⁶ .................................................. H01L 41/08
[52] U.S. Cl. .................................................. 310/323
[58] Field of Search ................................. 310/323, 328

[56] References Cited

U.S. PATENT DOCUMENTS

| | | | |
|---|---|---|---|
| 4,645,964 | 2/1987 | Hiramatsu et al. | 310/323 |
| 4,739,212 | 4/1988 | Imasaka et al. | 310/323 |
| 4,786,836 | 11/1988 | Tokushima | 310/323 |
| 4,833,359 | 5/1989 | Tanoue et al. | 310/323 |
| 4,926,085 | 5/1990 | Sawayama et al. | 310/323 |
| 4,935,659 | 6/1990 | Naka et al. | 310/328 |
| 5,013,956 | 5/1991 | Kurozumi et al. | 310/323 |
| 5,025,186 | 6/1991 | Tsukada | 310/323 |
| 5,034,646 | 7/1991 | Shirasaki | 310/323 |
| 5,079,470 | 1/1992 | Kasuga et al. | 310/323 |
| 5,091,670 | 2/1992 | Kawata et al. | 310/323 |
| 5,122,700 | 6/1992 | Tamai et al. | 310/323 |

FOREIGN PATENT DOCUMENTS

| | | | |
|---|---|---|---|
| 0136984 | 6/1988 | Japan | 310/323 |
| 0220774 | 9/1988 | Japan | 310/348 |
| 0277480 | 11/1988 | Japan | 310/348 |
| 0305772 | 12/1988 | Japan | 310/323 |
| 0252179 | 10/1989 | Japan | 310/323 |
| 0026277 | 1/1990 | Japan | 310/323 |

*Primary Examiner*—Clayton E. LaBalle
*Attorney, Agent, or Firm*—Fitzpatrick, Cella, Harper & Scinto

[57] ABSTRACT

A vibration driven motor of a construction in which the hardness of the sliding surface of a vibration member is lower than the hardness of the sliding contact portion of a member brought into pressure contact therewith, and the lateral width of the sliding contact portion of the vibration member is smaller than the width of the sliding contact portion of the member brought into pressure contact therewith, whereby the sliding member of the vibration member is caused to wear more than the sliding member of the member brought into pressure contact therewith, thereby to facilitate the discharge of the wear powder thereof and to eliminate the level difference wear of the movable member attributable to the comb-shaped projections and the deterioration of the planarity of the movable member similar thereto. Also, this structure prevents deterioration of accuracy in motor performance when a stopping or starting operation occurs at the same location, or when operating at extremely low speed control is effected, and abnormal wear of the sliding surface of the vibration member is prevented.

22 Claims, 2 Drawing Sheets

VIBRATION DRIVEN MOTOR

This application is a continuation of application Ser. No. 08/263,491 filed Jun. 21, 1994, now abandoned which is a continuation of Ser. No. 07/879,415 filed May 7, 1992, both now abandoned.

BACKGROUND OF THE INVENTION

1. Field of the Invention

The present invention relates to a vibration driven motor in which a voltage is applied to an electromechanical energy conversion element and which is driven by a travelling vibration wave generated in a vibration member.

2. Related Background Art

The general principle of a vibration driven motor utilizing a travelling vibration wave is as follows. A member comprising two groups of piezo-electric elements circumferentially arranged and secured to one surface of a ring-like resilient member made of a resilient material having a full length integer times as great as a certain length $\lambda$ is used as a vibration member (stator). These piezo-electric elements in each group are arranged at a pitch of $\lambda/2$ and so as to assume opposite expansion polarities alternately and in such a manner that between the two groups, there is a positional deviation of an odd number times of $\lambda/4$. Electrode film is provided on the two groups of piezo-electric elements. If an AC voltage is applied to only one group (hereinafter referred to A phase), the vibration member becomes such that a standing wave (wavelength $\lambda$) of such bending vibration that the central point of each piezo-electric element in that one group and points at intervals of $\lambda/2$ therefrom are the positions of antinodes, and that the central point between the respective positions of antinodes is the position of a node, is generated over the entire circumference of the resilient member. If an AC voltage is applied to only the other group (hereinafter referred to as B phase), a standing wave is likewise generated, but the positions of the antinodes and node thereof deviate therefrom by $\lambda/4$ relative to the standing wave of A phase. If AC voltages equal in frequency and having a time phase difference of 90° therebetween are applied to A and B phases at one time, the standing waves of the two phases are combined and, as a result, a travelling wave (wavelength $\lambda$) of bending vibration vibrating in the circumferential direction is generated in the resilient member. At this time, each point on the resilient member having a thickness effects elliptical motion. Consequently, if for example, a ring-like movable member as a rotor is brought into pressure contact with the other surface of the resilient member, this movable member receives a circumferential frictional force from the resilient member and is rotatively driven.

Also, it is usual to form a plurality of diametrical grooves circumferentially of the vibration member, and to increase the circumferential components of the elliptical motion in order to enhance motor efficiency. It has been confirmed that this is greatly effective. These grooves also have the effect of removing wear powder.

Referring to FIG. 7 of the accompanying drawings which is a schematic cross-sectional view of a vibration driven motor, the reference numeral 1 designates a vibration member comprising a ring-like resilient member 3 and a piezo-electric element 4 adhesively secured to the bottom surface of the resilient member 3, and having a number of comb-teeth 3a formed by the diametrical grooves of the resilient member 3. The reference numeral 2 denotes a movable member having a sliding material 5 attached to the outer edge portion of a ring 6, and this sliding material is brought into contact with the surface of the resilient member 3 by the pressing force of pressing means such as a spring, not shown.

On the basis of such a principle, the following is mentioned as the features of the vibration driven motor:

1) When no electric power is supplied, the motor has a holding torque and, moreover, does not cause hunting; and 2) The motor is quick in the rising and falling of rotation. (The mechanical time constant is small.)

Accordingly, the vibration driven motor can be said to be essentially suitable for highly accurate positioning. However if in the prior-art vibration driven motor shown in FIG. 7, polyimide (resin) filled with carbon fiber is disposed on the sliding material 5 forming the sliding surface of the movable member 2, and WC-Co (cermet) is disposed on the sliding surface of the resilient member 3 of the vibration member 1 to thereby construct a vibration driven motor, and positioning driving is actually effected, the accuracy of the motor is stable in the initial state, but positioning accuracy deteriorates with time.

So, when the vibration driven motor has been disassembled, it has been found that the sliding surface of the movable member 2 is in the shape of grooves and projections provided on the resilient member 3 of the vibration member 1, and level differences of the order of submicrons are circumferentially created. As a result, hitch is caused by the level difference portions and the edges of the projections of the vibration member.

Also, when the sliding surface of the movable member 2 has been examined carefully, it has been found that sliding wear is locally caused during the starting and stoppage of the motor to thereby form such level difference wear. Therefore, when as a countermeasure for the level difference wear, the resin has been disposed on the sliding surface of the vibration member 1, the WC-Co (cermet) has been disposed on the sliding surface of the movable member 2, and the positioning driving has been effected, circumferential level difference wear has not occurred.

However, in the above-described example of the prior art, the sliding surface of the vibration member 1 is softer than the sliding surface of the movable member 2. Therefore, the sliding surface (resin) of the vibration member 1 suffers from more wear, circumferential grooves are created in the sliding portion, and the discharge of wear powder becomes more difficult. Also, the inner and outer peripheral edges of the sliding portion of the movable member 2 contact with the edges of the grooves, and this has caused abnormal wear and output fluctuation.

SUMMARY OF THE INVENTION

It is the object of the present invention to provide a vibration driven motor which can prevent any abnormal wear and output fluctuation caused when the hardnesses of both sliding members forming the surfaces of contact between a vibration member and a movable member is such that the sliding member of the vibration member is softer.

One aspect of the present invention is to provide a vibration driven motor of a construction in which the hardness of the sliding surface of a vibration member is lower than the hardness of the sliding contact portion of a member brought into pressure contact therewith, and the lateral width of the sliding contact portion of the vibration member is smaller than the width of the sliding contact portion of the member brought into pressure contact therewith, whereby the sliding member of the vibration member is caused to wear more than the sliding member of the member brought into pressure contact therewith, to thereby facilitate the discharge of the wear powder thereof and to eliminate the level difference wear of the movable member attributable to comb-shaped projections and the deterioration of the planarity of the movable member similar thereto. In motor performance, the deterioration of accuracy when the stoppage of starting at the same location or extremely low speed control is effected is prevented, and the abnormal wear of the sliding surface of the vibration member is prevented.

DESCRIPTION OF THE PREFERRED EMBODIMENTS

Figure 1:
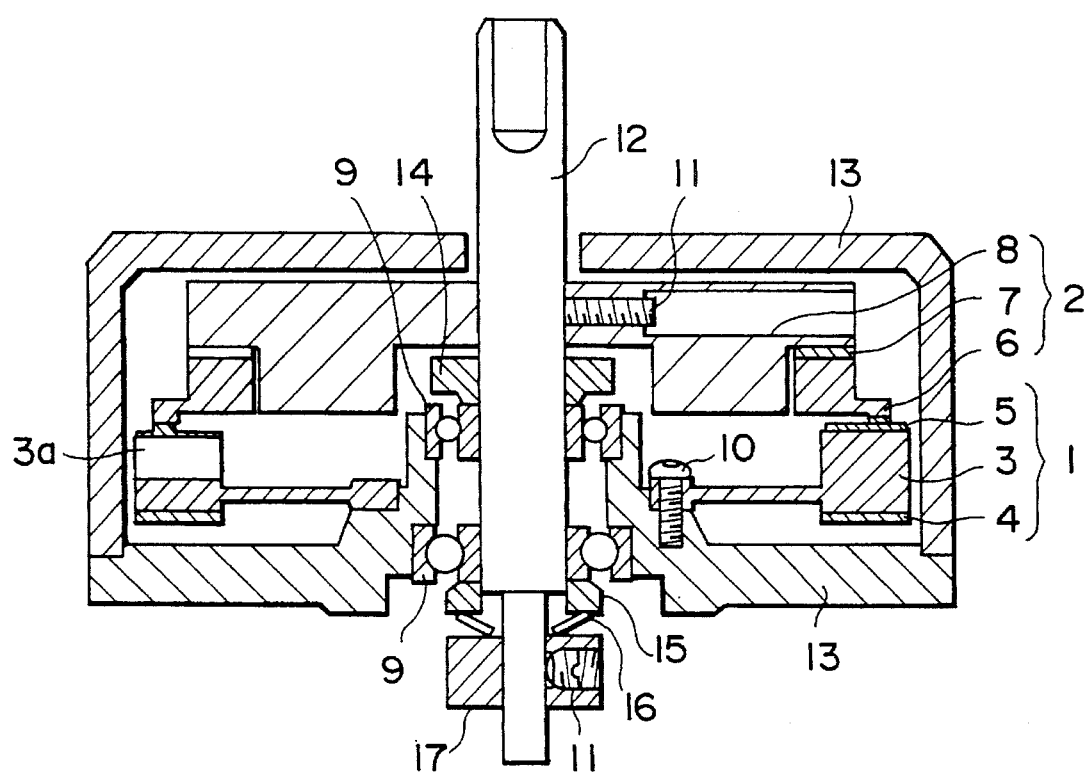
FIG. 1 is a cross-sectional view showing an embodiment of a vibration driven motor according to the present invention.
Figure 2:
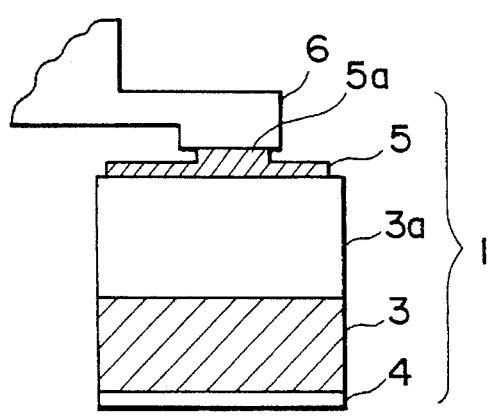
FIG. 2 is a transverse cross-sectional view of the essential portions of the vibration driven motor of FIG. 1.
Figure 3:
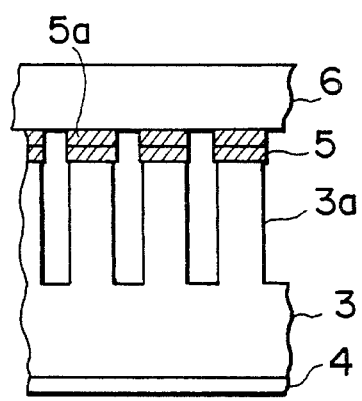
FIG. 3 is a side view of the essential portions of the vibration driven motor of FIG. 1.

FIGS. 1, and 2 and 3 show an embodiment of a vibration driven motor according to the present invention. In FIG. 1, the reference numberal 1 designates a vibration member comprising a ring-like metallic resilient member 3 formed, for example, of stainless steel or phosphor bronze having flexibility, ring-like piezo-electric elements 4 having two groups of piezo-electric elements polarized into a plurality and concentrically secured to one end surface of the resilient member 3 by means of a heat-resisting epoxy resin adhesive, and heat-resisting resin forming a sliding material 5 likewise secured to the other end surface of the resilient member 3. The resilient member 3 forming the adhesively secured surface of the sliding member 5 is regularly formed with a plurality of grooves in the circumferential direction thereof to enhance the efficiency of the motor, whereby comb teeth 3a are formed.

The reference numeral 2 denotes a movable member comprising a ring-like support member 8 formed of a metal such as an aluminum alloy and secured to an output shaft 12 by means of a screw 11, and a ring-like sliding member 6 provided with coating such as plating or thermal spraying or subjected to a hardening process and mounted on the end surface of the ring-like support member 8 with a rubber ring 7 interposed therebetween.

The vibration member 1 has the inner diameter portion of its resilient member 3 fixed to a case body 13 through a screw 10. Also, the output shaft 12 is axially movably mounted on the inner races of bearings 9 mounted in the case body 13, and the sliding member 6 of the movable member 2 is axially brought into pressure contact with the sliding member 5 of the vibration member 1 with a load of e.g. 10 kgf by the spring force of a belleville spring 16 resiliently mounted between a pressing boss 17 secured to the output shaft 12 by means of pre-pressure collars 14, 15 and a screw 11 and the pre-pressure collar 14.

The sliding member 5 adhesively secured to the surface of the resilient member 3 of the vibration member 1 is formed into a convex cross-sectional shape, and the sliding member 6 of the movable member 2 is brought into pressure contact with the convex portion 5a. The shapes of both of the sliding surfaces of the sliding members 5 and 6 are such that as shown in FIG. 2, the sliding member 6 of the movable member 2 is greater in diametrical width and the edge of the sliding member 6 does not contact the sliding surface of the sliding member 5 of the vibration member 1. The diametrical level difference of the sliding surface of the vibration member differs depending on the wear allowance of each vibration driven motor, but may desirably be 1 mm or less in order to transmit vibration efficiently, because generally materials of low hardness (resin and the like) are relatively great in the loss of visco-elasticity.

When an AC voltage of a frequency inherent to the vibration member 1 is applied to the two groups of piezo-electric elements comprising piezo-electric elements alternately polarized in the direction of thickness thereof, the vibration member 1 causes resonance and a travelling vibration wave is generated in the circumferential direction thereof, and the movable member 2 brought into pressure contact with the vibration member 1 is rotatively driven by the frictional force between the sliding surfaces of the vibration member 1 and the movable member 2.

Polyimide resin filled with carbon fiber was prepared as the sliding member 5 of the vibration member 1, thermal spraying coating of WC-Co (cermet) was applied as the surface hardening process for the movable member 2, two samples of polyimide resin which has the shape of the present embodiment and does not have such shape were prepared, and positioning control was carried out 100,000 times, whereby accuracy and wear situation were examined.

In the sliding member of the conventional shape having no level difference, stoppage accuracy began to deteriorate after about the 40,000th time, and after 100,000 times, the sliding member was decomposed wear powder was observed, and there were found many grains of about 10 μm having metallic luster. However, in the sliding member having the convex portion 5a of the present embodiment, no deterioration of stoppage accuracy was found within the range of 100,000 times, no wear powder had a metallic luster, and the diameter of the grains was of the order of microns. When the states of wear of both of the resin sliding surfaces were examined, the sliding surface having no level difference apparently suffered more from the roughness of the surface than the sliding surface having the level difference and moreover, had abrasive traces in a direction differing from the sliding direction.

On the other hand, when the sliding surfaces of the movable members 2 of the prior art and the present embodiment were examined, the movable member driven by the prior-art vibration member having no convex portion on the sliding member lacked the inner peripheral edge as compared with the movable member before driven, while the movable member driven by the vibration member of the present embodiment having the convex portion 5a on the sliding member had no lack of the edge and had a sliding trace of resin near the diametrically central portion thereof. From what has been described above, it is considered that the grains in the wear powder which have metallic luster are WC which fell off from the edge and one reason for the deterioration of stoppage accuracy is that WC grains were rolled up ont the sliding surface and during the stoppage, the movable member rode onto grains of about 10 μm because the amplitude of the vibration driven motor was as small as the order of 1 μm and another reason is that WC grains are hard and therefore attacked the resin surface to make it rough. As a result, the friction transmitting force of the sliding surface was not stable.

In the above-described embodiment, WC-Co thermal spraying materail is used as the sliding member 6 of the movable member 2, but with regard also to other thermal spraying materials or the plating or other hardening process, a similar phenomenon may occur when an inference is made from the above-noted reasons and therefore, it is necessary to adopt a shape like that of the present embodiment. With regard to the attachment of the resin to the resilient member of the vibration member 1 and the grooving work, in the present sample, ninety grooves each having a width of 1 mm were formed in a ring of stainless steel by a milling cutter. Thereafter, resin was adhered on the ring and the same number of rifts each having a width of 0.7 mm were formed in the resin again by the milling cutter. It is for the purpose of facilitate indexing that the rifts in the resin are made narrower than the grooves in the stainless steel. Of course, when the adhesive strength between the resin and the resilient member 3 is great, grooves may be formed in the resin and the resilient member at a time after the former is adhered on the latter. As a further alternative, resin worked in advance into a chip-like form may be adhered on the, comb-shaped projections of a grooved resilient member. Thereafter lathe turning or lapping may be effected and as required, level difference working may be effected, thereby accomplishing surface finishing. In this method, it is not necessary to make the sliding material such as resin into a ring, and there is no waste of the material.

Also, where thermoplastic resin is used, it can be directly secured to the resilient member by outsert molding and the labor of adhesion can be omitted.

In the present embodiment, resin filled with carbon fiber has been used as the resin and therefore, a carbide material has been used as the partner material. However, for soft resin such as non-filled resin or flurine compound resin, any special hardening process need not be applied to the movable member, and use can be made of stainless steel of Vickers hardness 200 or so, or brass of Vickers hardness 180 or so.

Also, where for example, the vibration member as the movable member is brought into pressure contact with a planar support member and the vibration member itself is moved by a travelling vibration wave generated on the vibration member, the planar support member may be subjected to a hardening process and resin may be adhered on the vibration member as in the present embodiment.

Figure 4:
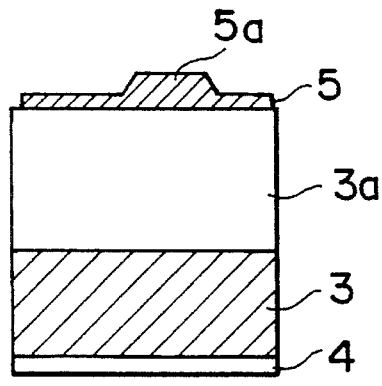
FIG. 4 is a transverse cross-sectional view of the essential portions of another embodiment of the vibration driven motor according to the present invention.
Figure 5:
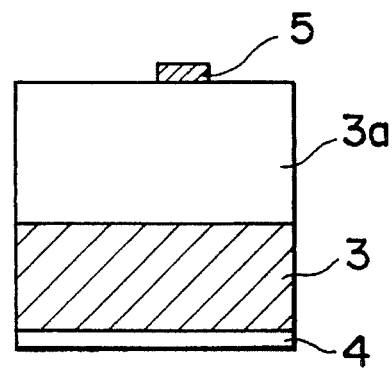
FIG. 5 is a transverse cross-sectional view of the essential portions of still another embodiment of the vibration driven motor according to the present invention.
Figure 6:
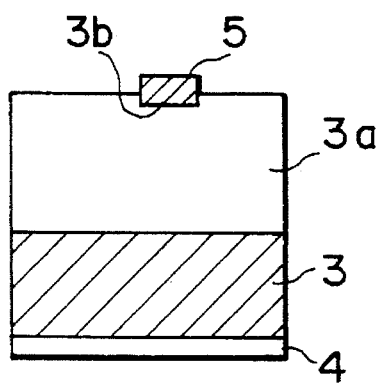
FIG. 6 is a transverse cross-sectional view of the essential portions of yet still another embodiment of the vibration driven motor according to the present invention.
Figure 7:
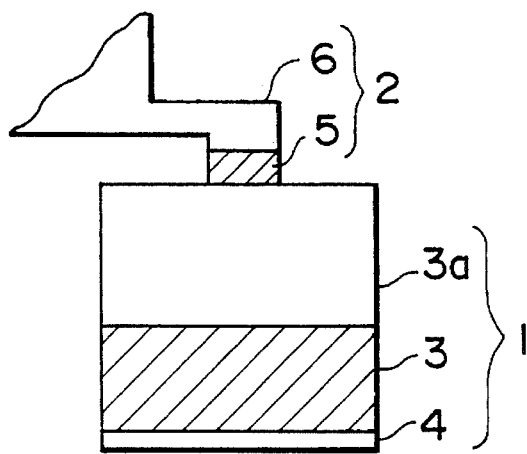
FIG. 7 is a transverse cross-sectional view of the essential portions of a vibration driven motor according to the prior art.

In the above-described embodiment, the convex portion 5a of rectangular cross-sectional shape is formed on the sliding member 5. Alternatively, the convex portion 5a may be formed into a trapezoidal shape as shown in FIG. 4. Also, as shown in FIGS. 5 and 6, the sliding member 5 itself may be formed into a rectangular cross-sectional shape (its width is narrower than that of the sliding member 6) and may protruded relative to the resilient member 3. In the case of FIG. 5, the sliding member 5 is directly secured to the surface of the resilient member 3, and in the case of FIG. 6, a groove 3b is formed in the surface of the resilient member 3 and the sliding member 5 is fitted into and adhesively fixed to the groove 3b.

As has hitherto been described, according to the present invention, where the vibration member in the vibration driven motor is of a ring shape and has comb-shaped projections in the circumferential direction, and where the partner member with which the sliding contact portion is brought into pressure contact is, for example, a movable member, the hardness of the sliding contact portion is made lower than the hardness of the sliding contact portion of the movable member and the diametrical width of the sliding contact portion of the vibration member is made smaller than the width of the sliding contact portion of the movable member, whereby there can be provided a vibration driven motor in which wear powder hardly collects on the sliding surface and the accuracy of positioning control or the like is not deteriorated.

What is claimed is:

1. A vibration driven motor comprising:

a vibration member for producing a vibration wave therein in response to an electrical signal, said vibration member having a plurality of comb-shaped projections along a direction of travel of said vibration wave, one end of each of said comb-shaped projections including a contact portion further projecting from said comb-shaped projection; and a contact member having a contact portion contacting the contact portions of said comb-shaped projections, said vibration wave causing relative movement between said vibration member and said contact member;

wherein a lateral width of each contact portion of said comb-shaped projections is smaller than a width of the contact portion of said contact member and a width of each comb-shaped projection, and wherein a hardness of the contact portions of the comb-shaped projections of the vibration member is lower than a hardness of the contact portion of the contact member.

2. A motor according to claim 1, wherein said comb-shaped projections of said vibration member and said contact portions of said vibration member are formed with materials different from each other.

3. A travelling wave driven actuator comprising:

a vibration member for producing a travelling wave therein in response to an electrical signal, said vibration member having a plurality of comb-shaped projections along a direction of travel of said travelling wave, one end of each of said projections including a contact portion further projecting from said comb-shaped projection; and a contact member having a contact portion contacting the contact portions of said comb-shaped projections, said travelling wave causing relative movement between said vibration member and said contact member;

wherein a lateral width of each contact portion of said comb-shaped projections is smaller than a width of the contact portion of said contact member and a width of each comb-shaped projection, and wherein a hardness of the contact portion of the vibration member is lower than a hardness of the contact portion of the contact member.

4. A vibration driven system comprising:

a vibration member for producing a vibration wave therein in response to an electrical signal, said vibration member having a plurality of comb-shaped projections along a direction of travel of said vibration wave, one end of each of said projections including a contact portion further projecting from said comb-shaped projection; and an output member having a contact portion contacting the contact portions of said comb-shaped projections, said vibration wave causing relative movement between said vibration member and said output member;

wherein a lateral width of each contact portion of said comb-shaped projections is smaller than a width of the contact portion of said output member and a width of each comb-shaped projection, and wherein a hardness of the contact portion of the comb-shaped projections of the vibration member is lower than a hardness of the contact portion of the output member.

5. A vibration driven motor, comprising:

a vibration member for producing a vibration therein in response to an electrical signal, said member including a projection which has an end portion including a contact portion further projecting from said projection; and a contact member having a contact portion provided in contact with the contact portion of the projection of said vibration member, said vibration causing relative movement between said vibration member and said contact member, wherein a width of the contact portion of said projection is narrower than a width of the contact portion of said contact member and a width of the projection, and wherein a hardness of the contact portion of said vibration member is lower than a hardness of the contact portion of said contact member.

6. A motor according to claim 5, wherein said vibration member includes a ring-shaped elastic element.

7. A motor according to claim 5, wherein the contact portion of said vibration member is formed with resin blended with carbon.

8. A motor according to claim 5, wherein the contact portion of said vibration member includes polyimide resin blended with carbon fiber.

9. A motor according to claim 5, wherein the contact portion of said contact member is formed by flame spraying coating of a film of WC-Co cermet.

10. A motor according to claim 5, wherein the contact member has a flat-plate shape and the vibration member is moved by the vibration generated therein.

11. A vibration driven motor comprising:

a vibration member for producing a vibration wave therein in response to an electrical signal, said vibration member having a plurality of comb-shaped projections along a direction of travel of said vibration wave, one end of each of said comb-shaped projections including a contact portion further projecting from said end of said comb-shaped projection;

a contact member having a contact portion contacting the contact portions of said comb-shaped projections, said vibration wave causing relative movement between said vibration member and said contact member;

wherein a lateral width of each contact portion of said comb-shaped projections is smaller than a width of the contact portion of said contact member and a width of each of said comb-shaped projections.

12. A motor according to claim 11, wherein said vibration member includes a ring-shaped elastic element.

13. A motor according to claim 11, wherein the contact portion of said vibration member is formed with resin blended with carbon.

14. A motor according to claim 11, wherein the contact portion of said vibration member includes polyimide resin blended with carbon fiber.

15. A motor according to claim 11, wherein the contact portion of said contact member is formed by flame spraying coating of a film of WC-Co cermet.

16. A motor according to claim 11, wherein said comb-shaped projections of said vibration member and said contact portion of said vibration member are formed with materials different from each other.

17. A vibration driven system comprising:

a vibration member for producing a vibration wave therein in response to an electrical signal, said vibration member having a plurality of comb-shaped projections along a direction of travel of said vibration wave, one end of each of said comb-shaped projections including a contact portion further projecting from said end of said comb-shaped projections; and an output member having a contact portion contacting the contact portions of said comb-shaped projections, said vibration wave causing relative movement between said vibration member and said output member;

wherein a lateral width of each contact portion of said comb-shaped projections is smaller than a width of the contact portion of said output member and a width of each of said comb-shaped projections.

18. A system according to claim 17, wherein said vibration member includes a ring-shaped elastic element.

19. A system according to claim 17, wherein the contact portion of said vibration member is formed with resin blended with carbon.

20. A system according to claim 17, wherein the contact portion of said vibration member includes polyimide resin blended with carbon fiber.

21. A system according to claim 17, wherein the contact portion of said contact member is formed by flame spraying coating of a film of WC-Co cermet.

22. A system according to claim 17, wherein said comb-shaped projections of said vibration member and said contact portion of said vibration member are formed with materials different from each other.

\* \* \* \* \*

UNITED STATES PATENT AND TRADEMARK OFFICE
CERTIFICATE OF CORRECTION

PATENT NO. : 5,463,265
DATED : October 31, 1995
INVENTOR(S) : KOJI KITANI, ET AL.

It is certified that error appears in the above-indentified patent and that said Letters Patent is hereby corrected as shown below:

<u>Column 1</u>

Line 4, "now abandoned" should be deleted.

<u>Column 4</u>

Line 47, "decomposed" should read --decomposed,--.

<u>Column 5</u>

Line 8, "ont" should read --onto--.
Line 16, "materail" should read --material--.

<u>Column 6</u>

Line 1, "protruded" should read --protrude--.

Signed and Sealed this

Second Day of April, 1996

Attest:

BRUCE LEHMAN

*Attesting Officer*  *Commissioner of Patents and Trademarks*